March 28, 1939. B. R. HARRIS 2,151,760
PROCESS OF TREATING EGG MATERIAL
Filed May 9, 1938
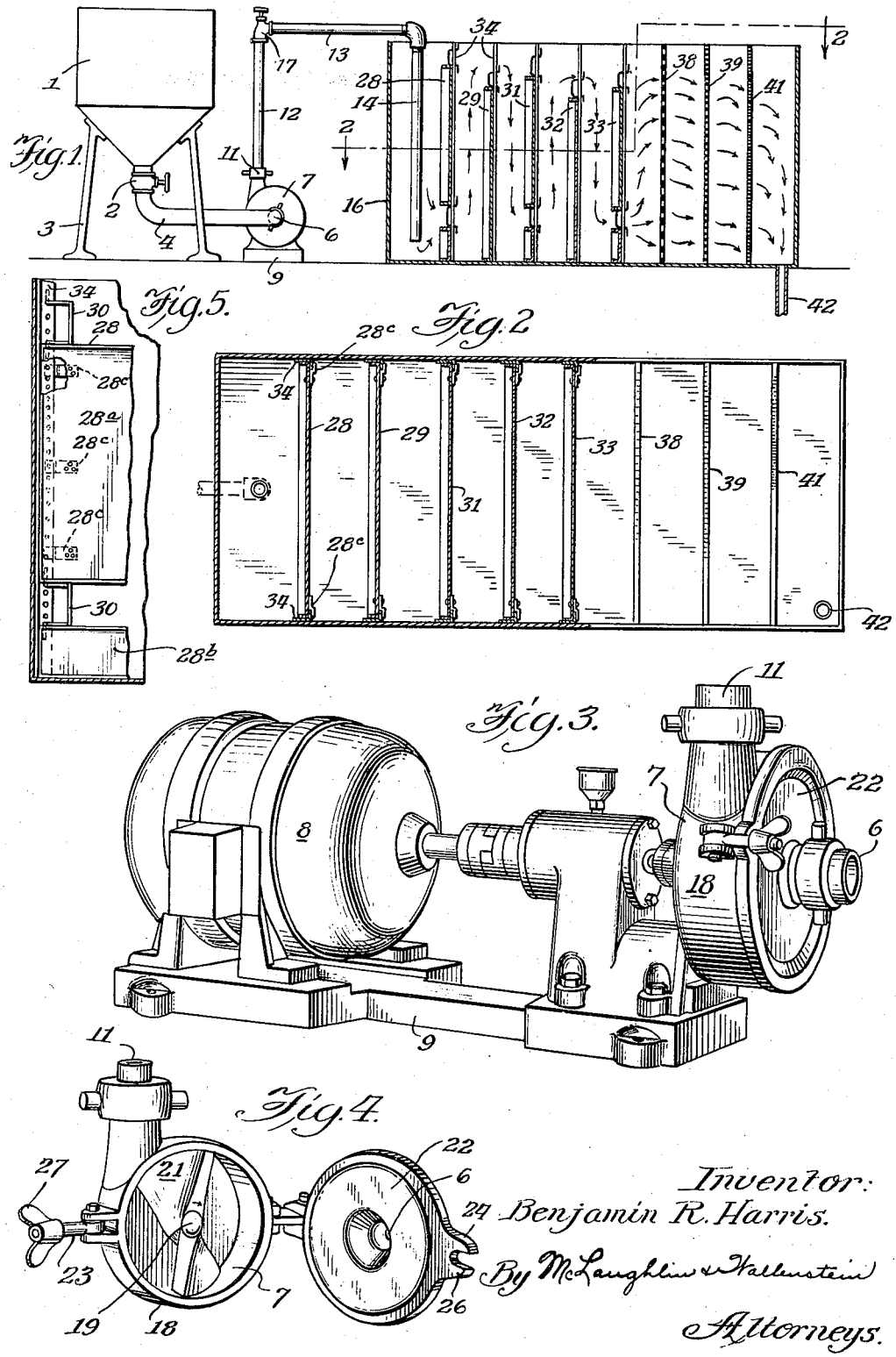
Inventor:
Benjamin R. Harris.
By McLaughlin & Wallenstein
Attorneys.

Patented Mar. 28, 1939

2,151,760

UNITED STATES PATENT OFFICE 2,151,760

PROCESS OF TREATING EGG MATERIAL

Benjamin R. Harris, Chicago, Ill.

Application May 9, 1938, Serial No. 206,729

9 Claims. (Cl. 99—113)

My invention relates to the treatment of liquid egg material, particularly liquid egg whites, preparatory to drying or canning and freezing the same.

In accordance with conventional commercial processes of treating, for example, egg whites and the like, the eggs are removed from the shells and the yolks separated from the whites. The whites, which are placed in tanks, are non-homogeneous in character, contain particles of dirt, egg shells, chalazae and other undesirable material. The art has long recognized that this product must be subjected to certain conditioning treatments in order to provide a clean, wholesome and more uniform egg white product which will satisfy the demands of the trade. Various methods of treatment have been suggested and employed in the prior art but all of them have at least some drawbacks.

Thus, for example, it has hitherto been proposed to pass the liquid egg material as, for example, whites, through a line strainer or filter, forcing them therethrough under pressure. This process, while resulting in a definite improvement in the appearance and characteristics of the egg material, particularly from the standpoint of homogeneity of the resulting product, has various disadvantages, chief among which is the frequent necessity for discontinuing operation and cleaning off the heavy accumulation of chalazae, stringy portions, shells and the like. The frequency with which such cleaning operations are required depends, of course, upon the size of the screen or filter and the amount of liquid egg material which is passed therethrough but, in general, the process possesses the definite disadvantage indicated. Another objection to this process resides in the fact that there is considerable wastage of egg material by reason of the aforementioned accumulations on the surface of said filter or screen. These accumulations contain egg material which, when recovered, can be sold only as a second-grade product.

Another method which has been suggested is to grind the liquid egg material by the use of burr stones or the like in order to break up the chalazae and stringy portions and to produce a uniform, homogeneous product. One of the chief disadvantages of this process is the fact that it is not easily or simply carried out and the resulting products are not as satisfactory as might be desired. For example, for some unknown reason, when liquid egg whites are subjected to this grinding operation and subsequently fermented and then dried, the products produced are not as uniform as might be expected and the process results in substantial losses by virtue of the non-uniformity of the fermentation. Thus, two grades of dried product are produced thereby resulting in large losses since a substantial amount of the product cannot be considered as constituting a grade A product and must be sold at a cheaper price than the major portion of the egg whites.

Still another method which has been suggested has been to force the liquid egg material through positively acting cutting elements positioned transversely of the line of flow of the egg material in order to comminute the membranous constituents thereof and to provide a homogeneous product. Here, again, the practice of the process still leaves something to be desired from the standpoint of the excellency and uniformity of the product, particularly when subjected to subsequent steps of controlled fermentation followed by drying.

Still another method which has been suggested has been to subject liquid egg whites to a rapid cutting action in an air tight mixer so as to render the product homogeneous, that is, to mix up the thick and thin portions of the egg whites. This method, too, offers certain practical objections.

I have discovered a novel method of treating liquid egg material, particularly liquid egg whites, which method can be carried out rapidly and expeditiously in a simple and inexpensive manner to produce uniform, homogeneous products with enhanced foaming and beating properties.

Liquid egg whites, as removed from the shells in commercial practice, are not only non-uniform in character and contaminated with dirt and the like but the chalazae is attached to the egg whites in such a way that it is exceedingly difficult to remove. Gravity filtering is entirely unsatisfactory since the filters are quickly clogged up and the desired separation of the chalazae cannot be successfully accomplished.

I have found, surprisingly enough, that by a simple and rapid passage of the liquid egg whites, as they are removed from the yolks in accordance with usual commercial practice, through a pump of the character described hereinafter, the liquid egg whites are rendered thin and readily filterable by gravity. The operation of passing the liquid egg whites through the said pump has the important and unexpected result of causing the adherence of the chalazae to the egg whites proper to be broken with the result that the separation of the chalazae can be accomplished by a simple gravity filtration treatment. I prefer, however, to cascade the treated liquid egg whites in a suitable tank whereby the chalazae float to the surface and may be removed by skimming or the like, and the heavier particles such as egg shells settle to the bottom of the tank. This results in an effective and easily accomplished removal of the major portion and larger particles of the chalazae and egg shells. The resulting product is then passed through a gravity strainer or preferably through straining or filtering elements disposed in the same tank where the cascading is carried out, all as hereinafter fully disclosed, whereby a clear, thin, homogeneous final product is obtained. For some reason not fully understood, the final egg white product has definitely superior foaming and beating properties over the product not so treated.

The liquid egg whites, treated as described, may then be packed into cans and frozen in accordance with known practice. Alternatively they may be dried in any suitable manner or, if desired, they may be preliminarily subjected to a controlled fermentation step and then dried. Independently of the subsequent treatment, the prior operations performed upon the liquid egg whites bring about marked and unexpected improvements which manifest themselves not only in the simplification of manipulative procedures and mechanical equipment employed but also in the quality and utility of the final egg white product.

In the accompanying drawing, I show one illustrative embodiment of a system for practicing my invention which is highly satisfactory for the accomplishment of the objects of my invention. In this drawing, Figure 1 is a generally schematic side view of a system which embodies features of my invention.

Figure 2 is a section along the line 2—2 of Figure 1 looking in the direction of the arrows.

Figure 3 is a perspective view of the pump and motor for operating the same.

Figure 4 is a perspective view of the pump, the cover being shown in open position so that the impeller may be seen clearly.

Figure 5 is a side elevation view, partly in section, showing the manner of mounting certain of the baffle plates in the cascading and filtering tank.

In general, the apparatus which I employ comprises a tank, a pump mounted upon a suitable base, driving means therefor, and settling and filtering means, suitable pipes or conduits serving to convey the egg material to and from the pump and settling and filtering means.

As shown in the drawing, numeral 1 comprises a supply tank having a control valve 2, said tank being supported on a suitable standard 3. The discharge end of said tank communicates with a pipe or conduit 4 which leads to the inlet port 6 of a pump 7 driven by a motor 8, the pump and motor being mounted on a base 9. The outlet port 11 of the pump is connected through pipes 12, 13 and 14 to discharge the egg material into the lower part of a settling and filtering chamber 16, a valve 17 in the discharge line serving to control or regulate the rate of discharge.

The pump 7 comprises a cylindrical casing 18, preferably of a corrosion resistant alloy, the interior surface being machined so as to provide a smooth surface free of cracks or crevices. Mounted on a shaft 19, supported in suitable bearings, which need not be described, is an impeller arm 21, of the screw type and preferably made in one piece. As shown in Figure 4, there is a slight clearance between the interior surface of the casing 18 and the periphery of said impeller arm. The cover 22 of the pump is hingedly supported upon ap air of ears forming a part of the casing 18, the cover being adapted to be tightly closed through the cooperating action of a swiveled threaded bolt 23 which is adapted to fit between a set of ears 24 and 26 on the cover 22, wing nut 27 serving to effect the tight engagement of the cover and the edge of the casing against which it abuts.

The inlet opening or port 6 of the pump is at approximately the center of the cover 22 and it will be seen, therefore, that the egg material is fed into the pump in a direction longitudinally of the axis of rotation of the impeller shaft. In other words, the axis of the inlet opening of the pump is substantially parallel to the axis of the impeller shaft. Again, in this same general connection, it should be observed that the impeller arm is mounted on said impeller shaft at substantially right angles thereto. The outlet opening or port 11 of said pump is formed on the casing 18 and it will be observed that the discharge of egg material from said pump is generally tangential to the periphery of the casing.

Reverting now to Figure 1, the cascading and settling tank 16, into which the egg material discharges from the pipe 14, is generally rectangular in shape and contains a series of plates and filter members. The plates 28, 29, 31, 32 and 33, which are in the form of shallow pans, are removably mounted in the tank 16, fitting against angle portions 34 fixed to the sides of the tank, said angles being provided with a series of apertures along their lengths. The plate 28 is higher than the succeeding plates and the plates 31 and 33 are intermediate in height between the plates 28 and 29, and 31 and 32, respectively. The plates 28, 31 and 33 are made up of two separate plates, each in the form of shallow pans, spaced from each other, as will be described, but the plates 29 and 32 are each one-piece solid plates. Considering Figures 1 and 5, plate 28 is made up of an upper plate 28a and a smaller plate 28b, spaced from each other and held in place by means of spring members which fit into apertures in the angle members 34. Said plate is provided on its rear surface with spaced hooks 28c to hold said plate against the angle 34. It will be seen, therefore, that the plate portion 28a is spring mounted and that there is a space between the plate portions 28a and 28b, in the lower part of the tank 16, through which egg material may pass. Plates 31 and 33 are similar to plate 28 and are similarly mounted. The plates 28, 29, 31, 32 and 33 comprise a cascade system, the egg material passing therethrough in the path indicated by the arrows in Figure 1. The gentle, rolling or cascading action to which said egg material is thereby subjected serves to cause at least the larger pieces of egg shells and the like to settle out and at the same time the agitation is insufficient to cause foaming or undesirable incorporation of air into said egg material.

In advance of the cascading plates in the direction of movement of the egg material in the tank 16 is a series of filtering plates. In the embodiment shown, three filtering plates, 38, 39 and 41, are utilized, the filter openings in the filter plates 38, 39 and 41 being progressively smaller. In certain instances, I may employ only one filter plate and in other instances more than three but, for most purposes, three plates will be quite suitable. Moreover, in certain cases, I have mounted a basket or cylindrical type of strainer in the tank 16 in advance of the cascade plates 28, 29, 31, 32 and 33 so that the egg material receives a preliminary relatively coarse filtering whereby relatively large particles of egg shells and the like are removed before the egg material is discharged into the tank 16 and cascaded and filtered. At the bottom of the tank 16, a discharge opening 42 is provided through which the treated egg material is discharged to suitable mixing tanks or the like where it may be admixed with treating materials such as salt or sugar or the like or packed into cans in which it is frozen or otherwise treated.

The operation of the described apparatus is thought clear in the light of the previous description. Briefly, however, the liquid egg material, such as egg whites, is poured into the supply tank 1 and the pump casing is permitted to become filled with egg material before the operation of the impeller arm is initiated, in order to insure against air being drawn into and whipped up with the egg material. The motor 8 is then connected to a source of current and egg material is drawn through the pump 7 and discharged through pipes 12, 13 and 14 into the tank 16. It then passes through and over the plates 28, 29, 31, 32 and 33 of the cascade whereby egg shells and the like settle out. By reason of the passage of the egg material through the pump 7, wherein it is subjected to a pushing action whereby the flow is gentle and without agitation or churning, said egg material, surprisingly enough, becomes thin, homogeneous and readily filterable, the chalazae and shells and the like being removable with relative ease. Hence, the egg material may be easily filtered through the screens 38, 39 and 41 and said screens may be employed for substantial periods of time without the necessity for cleaning the same. The treated egg material is discharged through the outlet 42 and may further be processed in any desired manner.

While the dimensions of the pump, the speed of the rotation of the impeller arm, and the rate of feed of the egg material are obviously all subject to variation, I have obtained particularly satisfactory results by employing a pump the casing diameter of which was from 8 to 10 inches, the R. P. M. of the impeller arm being about 1750, and the rate of feed of the egg material being from 50 to 120 pounds per minute.

The practice of my invention brings about definite savings in operation over and above that which has been set forth hereinabove. Thus, for example, whereas filtering of the untreated egg material, for example, egg whites, results in an entrapment of desirable egg material in the chalazae which collects on the filter surface and a consequent loss of such product so far as the production of a grade A material is concerned, by the practice of my process all of the available egg material present is recovered since, as stated, the chalazae are dislodged and, therefore, do not entrap or occlude valuable and desired egg material when the treated egg material is filtered.

It will be seen that the apparatus which I utilize is exceedingly simple and highly sanitary. Thus, for example, the pump has only a single moving part and the character of its construction is such that egg material cannot become lodged and collect in any crevices, thereby resulting in minimum bacterial contamination.

While, in my preferred embodiment, as illustrated in the accompanying drawing, I cascade the egg material after passage through the pump, I may, in certain cases, filter the egg material directly after passage through the pump. Alternatively, I may subject the egg material to a coarse gravity straining treatment after passage through the pump and prior to the cascading treatment or, again, the cascading treatment may be replaced by a conventional settling treatment after which the egg material may be filtered as desired. Instead of filtering the egg material after passage of the same through the pump, I may centrifuge the same in the usual imperforate bowl centrifugal separators or similar equipment to bring about the separation of the desired egg material from the undesired egg shells, chalazae and the like.

My process has particular utility for the treatment of liquid egg whites as they are removed from the shells and separated from the yolks. However, the invention may be practiced with definite advantages in the treatment of liquid egg yolks, liquid whole eggs, or mixtures of liquid egg whites and yolks in any proportions, as well as in the treatment of thawed-out frozen whites or egg materials to produce products having enhanced beating and foaming properties. I employ the term "egg material" to mean whites, yolks, whole eggs, or any mixture of whites and yolks.

The egg material, by treatment in accordance with the present invention, is modified considerably from the standpoint of its physical and colloidal properties. The pushing action of the impeller arm, and the centrifugal action caused by the rapid rotation thereof, though over only a period of a short time, unexpectedly result in reducing the viscosity of the egg material, dislodging the chalazae, and otherwise modifying the character of the product which reflects itself, among other things, in improved beating and foaming properties and an enhanced utility in the baking of cakes and the like.

It will be understood that the description of my invention, as set forth above, is to be taken as illustrative and in no sense limitative of the full scope thereof, the latter being pointed out in the claims.

What I claim as new and desire to protect by Letters Patent of the United States is:

1. A method of treating liquid egg material which comprises providing a relatively narrow casing having inlet and outlet openings and a rapidly rotating generally screw shaped impeller arm, there being a slight clearance between the interior surface of said casing and the periphery of said impeller arm, passing liquid egg material, as removed from the shells, through said casing while rapidly rotating said impeller arm whereby said liquid egg material becomes substantially less viscous, the chalazae become readily separable therefrom, and the filterability of said egg material is considerably facilitated, and then filtering the resultant egg material to remove egg shells, chalazae and other undesired material, whereby a thin, homogeneous liquid egg material is obtained.

2. A method of treating liquid egg material which comprises providing a casing having inlet and outlet openings and a rapidly rotating generally screw shaped impeller arm, there being a slight clearance between the interior surface of said casing and the periphery of said impeller arm, passing liquid egg material, as removed from the shells, through said casing while rapidly rotating said impeller arm, whereby said liquid egg material becomes substantially less viscous, the chalazae become readily separable therefrom, and the filterability of said egg material is considerably facilitated, cascading the resulting liquid egg material whereby at least a substantial part of the chalazae come to the surface and are removed by skimming and at least a substantial part of the egg shells settle out from said liquid egg material, and then filtering the resulting egg material to remove substantially all remaining egg shells, chalazae and other undesired material, whereby a thin, homogeneous liquid egg material is obtained.

3. A method of treating liquid egg whites which comprises providing a casing having inlet and outlet openings and a rapidly rotating impeller arm set at substantially right angles to the axis of the shaft upon which it rotates, there being a slight clearance between the interior surface of said casing and the periphery of said impeller arm, the axis of the inlet opening being substantially parallel to the axis of the shaft upon which the impeller arm rotates and the axis of the outlet opening being at substantially right angles to the axis of the impeller shaft, passing liquid egg whites, as removed from the shells and as separated from the yolks in accordance with conventional commercial practice, into said inlet opening and through said casing while rapidly rotating said impeller arm whereby said liquid egg whites become substantially less viscous, the chalazae being readily separable therefrom, and the filterability of said egg whites is considerably facilitated, subjecting said treated liquid egg whites to a settling operation whereby chalazae come to the surface and the relatively large particles of egg shells which may be present settle to the bottom, removing said liquid egg whites from the said chalazae and egg shells, and then filtering the resultant egg whites to remove such particles of egg shells, chalazae and other undesired material which may be present, whereby a thin, homogeneous liquid egg white product is obtained having enhanced foaming and beating properties.

4. A method of treating liquid egg whites which comprises providing a generally cylindrical casing having an impeller arm of general screw shape mounted therein for rapid rotation, there being a slight clearance between the interior surface of said casing and the periphery of said impeller arm, passing liquid egg whites, as removed from the shells and separated from the yolks in accordance with conventional commercial practice, in a continuous stream through said casing while rapidly rotating said impeller arm, said liquid egg whites being passed through said casing at the rate of at least fifty pounds per minute and the flow of said egg whites being in a direction perpendicular to the axis of rotation of said impeller arm, whereby said liquid egg whites become substantially less viscous, the chalazae become readily separable therefrom, and the filterability of said egg whites is considerably facilitated, and then filtering said treated egg whites to remove egg shells, chalazae and other undesired material, whereby a thin, homogeneous liquid egg white product is obtained having enhanced foaming and beating properties.

5. A method of treating liquid egg whites to facilitate filtering thereof which comprises providing a generally cylindrical casing having an impeller arm of general screw shape mounted therein for rapid rotation, continuously introducing liquid egg whites into said casing, substantially out of contact with air, and into the path of said rapidly rotating impeller arm, the flow of said egg whites being in a direction perpendicular to the axis of rotation of said impeller arm, the liquid egg whites introduced into said casing being ejected therefrom in a short period of time, and then subjecting the treated liquid egg whites to steps to effect the removal of chalazae, shells and the like.

6. A method in accordance with claim 5 wherein the impeller arm rotates at a speed of at least about 1000 R. P. M.

7. A method of treating liquid egg whites which comprises providing a relatively narrow casing having inlet and outlet openings and a rapidly rotating generally screw shaped impeller arm, there being a slight clearance between the interior surface of said casing and the periphery of said impeller arm, passing liquid egg whites, as removed from the shells and as separated from the yolks in accordance with conventional commercial practice, through said casing while rapidly rotating said impeller arm whereby said liquid egg whites become substantially less viscous, the chalazae become readily separable therefrom, and the filterability of said egg whites is considerably facilitated, the liquid egg whites being ejected from said casing within a short period from the time of their introduction thereinto, and then filtering the resultant egg whites to remove egg shells, chalazae and other undesired material, whereby a thin, homogeneous liquid egg white product is obtained having enhanced foaming and beating properties.

8. A method of treating liquid egg whites which comprises providing a casing having inlet and outlet openings and a rapidly rotating generally screw shaped impeller arm, there being a slight clearance between the interior surface of said casing and the periphery of said impeller arm, passing liquid egg whites, as removed from the shells and as separated from the yolks in accordance with conventional commercial practice, through said casing while rapidly rotating said impeller arm, whereby said liquid egg whites become substantially less viscous, the chalazae become readily separable therefrom, and the filterability of said egg whites is considerably facilitated, cascading the resulting liquid egg whites whereby at least a substantial part of the chalazae come to the surface and are removed by skimming and at least a substantial part of the egg shells settle out from said liquid egg whites, and then filtering the resulting egg whites to remove substantially all remaining egg shells, chalazae and other undesired material, whereby a thin homogeneous liquid egg white product is obtained having enhanced foaming and beating properties.

9. A method of treating liquid egg whites which comprises providing a casing having inlet and outlet openings and a rapidly rotating generally screw shaped impeller arm, there being a slight clearance between the interior surface of said casing and the periphery of said impeller arm, the axis of the inlet opening being substantially parallel to the axis of the shaft upon which the impeller arm rotates and the axis of the outlet opening being at substantially right angles to the axis of the impeller shaft, passing liquid egg whites, as removed from the shells and as separated from the yolks in accordance with conventional commercial practice, into said inlet opening and through said casing while rapidly rotating said impeller arm whereby said liquid egg whites become substantially less viscous, the chalazae become readily separable therefrom, and the filterability of said egg whites is considerably facilitated, subjecting said treated liquid egg whites to a settling operation whereby chalazae come to the surface and the relatively large particles of egg shells which may be present settle to the bottom, removing said liquid egg whites from the said chalazae and egg shells, and then filtering the resultant egg whites to remove such particles of egg shells, chalazae and other undesired material which may be present, whereby a thin, homogeneous liquid egg white product is obtained having enhanced foaming and beating properties.

BENJAMIN R. HARRIS.